(12) United States Patent
Poulsen

(10) Patent No.: US 6,789,486 B2
(45) Date of Patent: Sep. 14, 2004

(54) TWO-AXIS SINGLE-PIECE FLEXURE AND FLEXURE APPARATUS

(75) Inventor: Andrew S. Poulsen, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/060,543

(22) Filed: Jan. 30, 2002

(65) Prior Publication Data

US 2003/0140824 A1 Jul. 31, 2003

(51) Int. Cl.⁷ .............................................. A47B 57/00
(52) U.S. Cl. ......................... 108/59; 108/161; 108/91
(58) Field of Search ........................ 108/59, 180, 161, 108/91, 92, 93, 53.1, 55.3, 53.5; 248/174

(56) References Cited

U.S. PATENT DOCUMENTS

| | | | | |
|---|---|---|---|---|
| 3,141,423 A | * | 7/1964 | Christensen | 108/190 |
| 3,648,627 A | * | 3/1972 | Schliemann et al. | 108/162 |
| 4,182,244 A | * | 1/1980 | Hutchins et al. | 108/91 |
| 4,183,488 A | * | 1/1980 | Shepard | 108/190 |
| 4,961,506 A | * | 10/1990 | Lang | 108/186 |
| 5,918,551 A | * | 7/1999 | Liu | 108/55.1 |
| 6,148,736 A | * | 11/2000 | Erbs | 108/27 |

FOREIGN PATENT DOCUMENTS

| | | | | |
|---|---|---|---|---|
| DE | 3301658 A | * | 8/1983 | 108/96 |
| FR | 2259567 | * | 3/1975 | 312/351 |

* cited by examiner

*Primary Examiner*—Jose V. Chen

(57) ABSTRACT

A single-piece flexure and flexure apparatus according to an embodiment allows movement along two perpendicular axes. The flexure is made from a single continuous material having a first and second flexure sections, with the second flexure section allowing translational movement in a direction perpendicular to that allowed by the first flexure section. Two-dimensional flexure assemblies may then be manufactured using these flexures. The flexure apparatus is made from a single contiguous material fashioned to provide a base section and a plurality of legs extending perpendicularly from the base section, with each leg having a first and second flexure sections, with the second flexure section allowing translational movement in a direction perpendicular to that allowed by the first flexure section.

15 Claims, 4 Drawing Sheets

TWO-AXIS SINGLE-PIECE FLEXURE AND FLEXURE APPARATUS

BACKGROUND OF THE INVENTION

Mechanical devices often require an assembly that allows linear motion with essentially no static friction involved. In many instances, such functionality has been provided via flexures, which consist primarily of two or more semi-rigid elastic members attaching a stable base to a plate or other object that is to be allowed to move in some specified direction. For example, FIG. 1 shows a one-dimensional flexure assembly 100, having a base plate 110, to which four flexures 120 are attached using screws 130. At the opposite end of each flexure 120 is attached the moving object, which in this case is a moving plate 50. Each flexure 120 is thin enough to allow translational movement of moving plate 50 perpendicular to flexures 120, as indicated by the arrow displayed in FIG. 1. Additionally, the object to be moved is not limited to a plate such as the moving plate 50, but may be something rigidly attached to the moving plate 50, or may replace the moving plate 50 entirely.

At times, two-dimensional movement of the object may be desired, depending on the particular application involved. In such cases, a two-dimensional flexure assembly, such as an assembly 200 shown in FIG. 2, is employed to allow such motion. Again, a base plate 110 is typically used, to which the ends of four flexures 120 are attached. At the opposite end of each of the flexures 120 is attached an intermediate plate 210, which moves one-dimensionally as allowed by the four flexures 120 attached to the base plate 110. A second set of four flexures 120 is then attached at one end to intermediate plate 210, and oriented perpendicular to the first four flexures 120 attached to base plate 110 so that the movement allowed by the second four flexures 120 is essentially perpendicular to that allowed by the first four flexures 120. The ends of the second four flexures 120 opposite those attached to intermediate plate 210 are connected to a moving plate 50, thus allowing the moving plate 50 to translate two-dimensionally in any direction parallel to base plate 110, as indicated by the arrows shown in FIG. 2.

Unfortunately, two-dimensional flexure assemblies such as assembly 200 shown in FIG. 2 require multiple components, which in this case are two plates, eight flexures, and a multitude of screws, bolts, rivets, or equivalent connectors. Such a high part count typically results in increased cost, prolonged assembly time, and a possible decrease in assembly reliability.

Therefore, from the foregoing, a new two-dimensional flexure and flexure apparatus comprised of fewer components, thus enhancing reliability while diminishing part cost and assembly time, would be advantageous.

SUMMARY OF THE INVENTION

Embodiments of the present invention, to be discussed in detail below, allow for a two-axis flexure and flexure apparatus, each of which is made of a single contiguous piece of semi-rigid material. The flexure has a first and second flexure section, with the second flexure section being oriented so that the direction of translational motion allowed by that second flexure section is essentially perpendicular to that allowed by the first flexure section. Such flexures may be used in various multi-piece two-dimensional flexure assemblies.

A single-piece flexure apparatus, according to an embodiment of the invention, has a base section, and two or more legs extending substantially perpendicularly from the base section. Each of the legs has a first and second flexure section, with the first flexure section being positioned between the base section and the second flexure section. The second flexure section of each leg is oriented so that the direction of translational motion allowed by that second flexure section is essentially perpendicular to that allowed by the first flexure section. An object coupled to the second flexure section of each leg would then be allowed to move in two dimensions perpendicular to the legs.

Other aspects and advantages of the invention will become apparent from the following detailed description, taken in conjunction with the accompanying drawings, illustrating by way of example the principles of the invention.

DETAILED DESCRIPTION OF THE PREFERRED EMBODIMENTS

The embodiments of the invention, which are described below, allow movement of an object in two dimensions with essentially no static friction by way of either a flexure or flexure apparatus composed of a single contiguous piece of semi-rigid material, thereby limiting the number of components required, resulting in brief assembly times and enhanced apparatus reliability.

Figure 3:
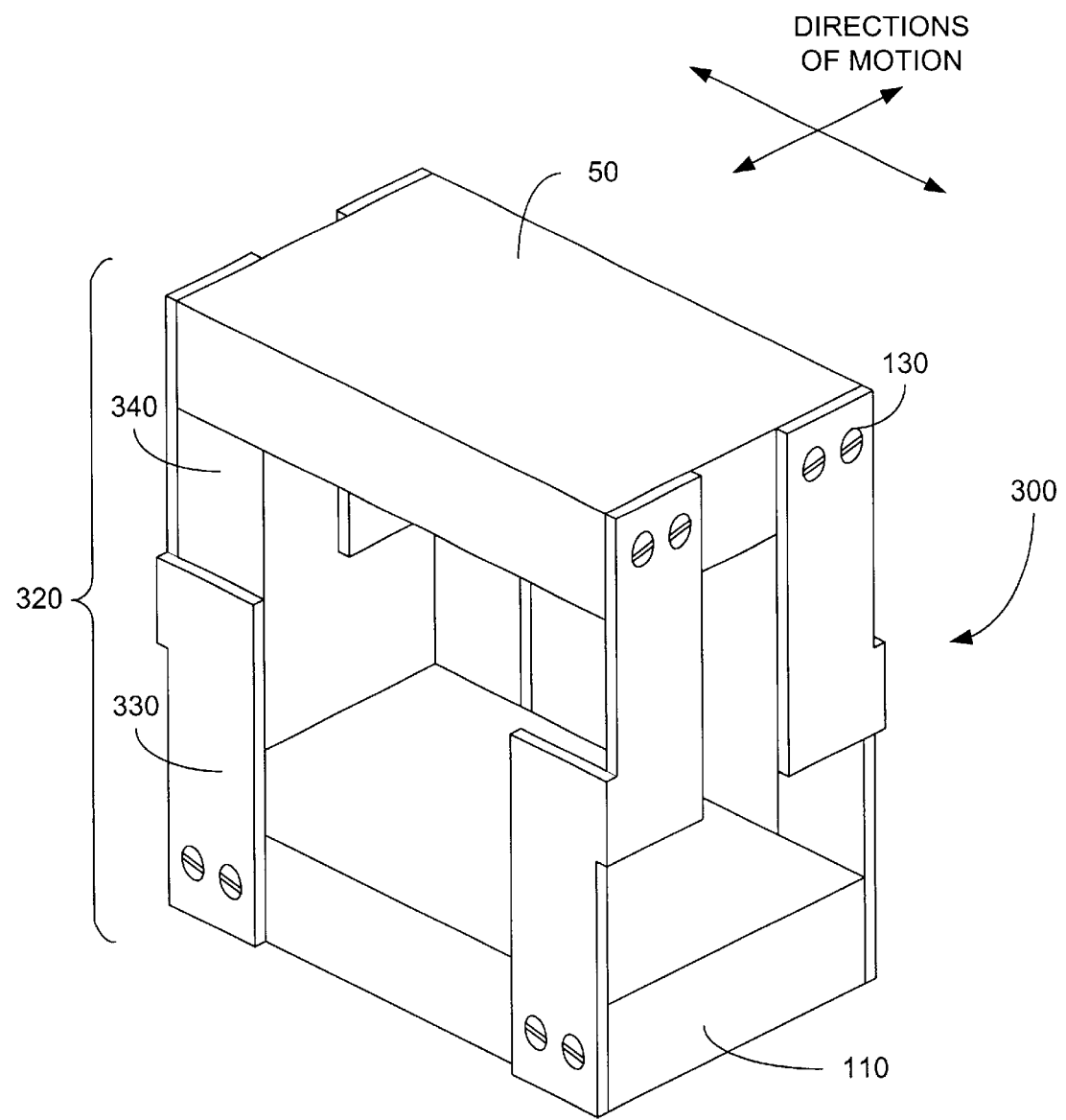
FIG. 3 is a perspective view of a two-dimensional flexure assembly utilizing a set of two-dimensional flexures according to an embodiment of the invention.

Shown in FIG. 3 is a particular embodiment, a two-dimensional flexure 320, of the present invention, which is utilized as part of a flexure assembly 300. Each of the four flexures 320 is attached to a base plate 110 by way of screws 130 (as shown in FIG. 3), bolts, rivets, or equivalent connectors.

Each flexure 320 is fashioned from a single piece of semi-rigid material, including, but not limited to, sheet metal, metal, or plastic. For example, in the case of sheet metal, the flexures 320 may be formed by stamping out the proper shape required, followed by bending the metal into its final configuration. If metal is utilized, the flexures 320 may be formed by way of metal injection molding (MIM), among other techniques. If plastic is employed, the proper shape required for the flexure 320 and other embodiments of the invention can be attained by way of injection molding, shaping by way of heating and bending, or other means typically used for plastic materials. Additionally, the materials used in any particular application, the thickness of that material, and the geometry of the flexures 320 are determined by the rigidity and motion requirements of the apparatus.

The flexure 320 is composed of a first flexure section 330 and a second flexure section 340. In FIG. 3, the first flexure section 330 is positioned between a base plate 110 and the second flexure section 340, which is coupled with a moving plate 50. The two flexure sections 330 and 340 of each flexure 320 are positioned so that the direction of translational movement allowed by the first flexure section 330 is essentially perpendicular to the direction of translational movement allowed by the second flexure section 340. The relative orientation of the flexure sections 330 and 340 allow movement of the moving plate 50 in two dimensions perpendicular to the general direction indicated by the flexures 320. In the specific embodiment of FIG. 3, the first flexure sections 330 allow movement of the moving plate 50 perpendicular to the long axis of the base plate 110. Also, the second flexure sections 340 allow movement parallel to the long axis of the base plate 110.

Additionally, as can be seen from FIG. 3, the first 330 and second 340 flexure sections are detached from each other and extend in opposite directions beyond a portion of the flexure where the first flexure section is attached to the second flexure section. The first flexure section 330 has a first broad surface in relation to its thickness. The thickness of the first flexure section 330 is thin enough to allow translational motion perpendicular to the first broad surface and the first broad surface is wide enough to resist translational motion parallel to the first broad surface. Similarly, the second flexure section 340 has a second broad surface in relation to its thickness. The thickness of the second flexure section 340 is thin enough to allow translational motion perpendicular to the second broad surface and the second surface is wide enough to resist translational motion parallel to the second broad surface. The second flexure section 340 is oriented perpendicular to the first flexure section 330 so that the direction of translational motion allowed by the second flexure section 340 is essentially perpendicular to the direction of translational motion allowed by the first flexure section 330. This allows for the two-dimensional translational motion of the flexure perpendicular to the length of the flexure.

In the embodiment of FIG. 3, four flexures 320 are employed. However, other embodiments of the present invention may utilize more or fewer flexures 320 depending on the requirements of the particular application involved. For example, if more rigidity in compression along the general direction defined by the flexures 320 is desired, more flexures 320 may be employed. However, if compression is not a significant concern, fewer flexures 320 may be called for. For example, using the embodiment of FIG. 3 as a starting point, one more flexure 320 could be added along each of the long edges of the base plate 110 to provide more rigidity. Alternately, only two flexures 320, extending from opposite corners of the base plate 110, may be employed if additional rigidity is not required.

Figure 4:
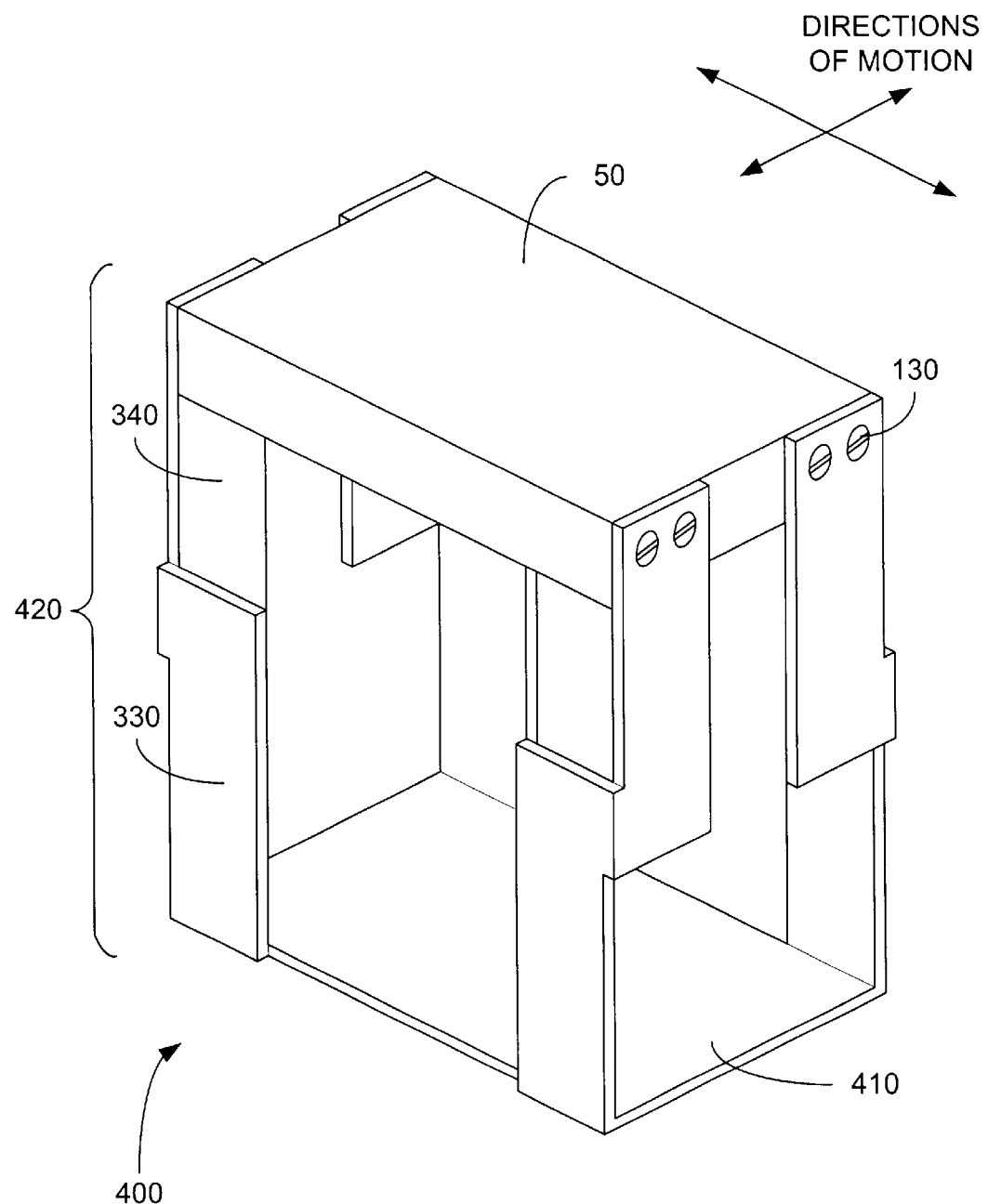
FIG. 4 is a perspective view of a two-dimensional flexure apparatus according to an embodiment of the invention.

Taking this concept further, an entire flexure apparatus 400, as shown in FIG. 4, can be fashioned from a single portion of a semi-rigid material, using the same materials and methods described earlier for the flexures 320. The apparatus 400 has a base section 410 that is employed to support the remaining portions of the apparatus 400. In the embodiment of FIG. 4, the base section 410 is shown to be generally rectangular; however, other shapes, as dictated by the particular application in which the apparatus is to be employed, may be used. For example, the base section 410 could be formed in the shape of a square, especially if the object to be moved also exhibits that same general shape.

Figure 1:
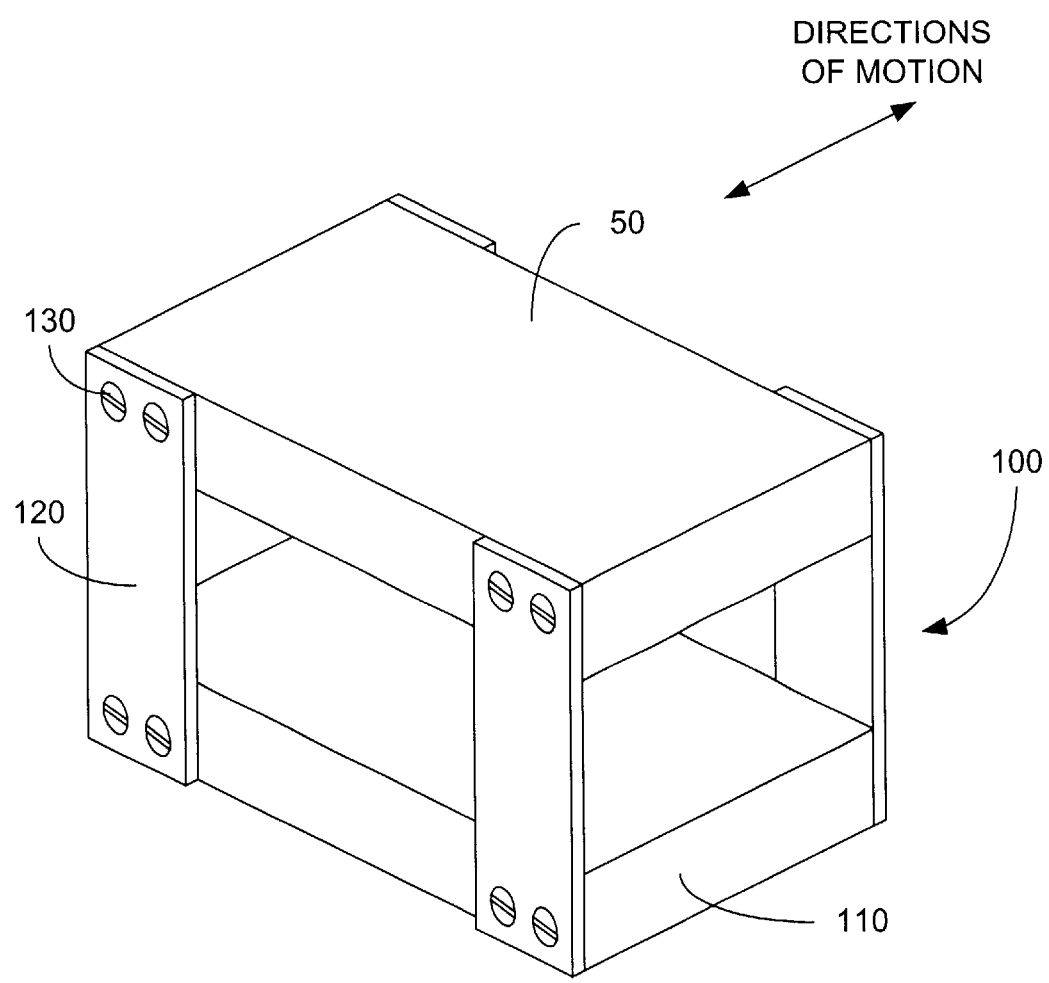
FIG. 1 is a perspective view of a one-dimensional flexure assembly from the prior art.
Figure 2:
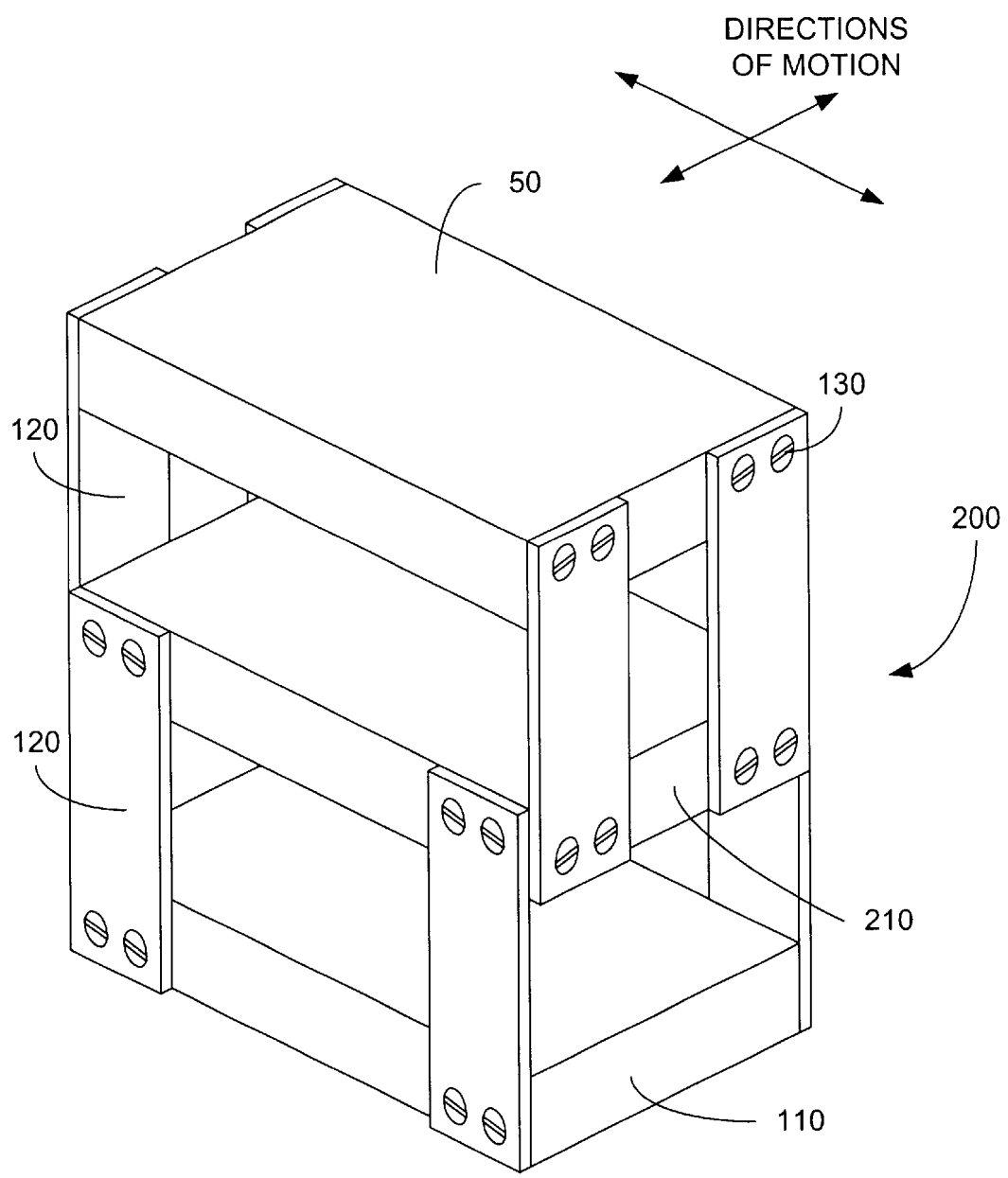
FIG. 2 is a perspective view of a two-dimensional flexure assembly from the prior art.

Extending substantially perpendicularly from the base section 410 are a plurality of legs 420 that are coupled with an object that is to be allowed to translate in two dimensions, such as the moving plate 50 from FIG. 1. In FIG. 4, screws 130 are utilized to couple the legs 420 with the moving plate 50, but other means, such as rivets, welds, or the like, such that the moving plate 50 is coupled with the legs 420 may be employed. Also, other objects that require the type of movement that a two-dimensional flexure assembly provides may either be connected to the moving plate 50, or may be substituted for the moving plate 50 by being coupled directly to the legs 420.

Each leg 420 of the apparatus 400 is composed of two flexure sections, as was the case for each flexure 320 described earlier. A first flexure section 330 is positioned between the base section 410 and a second flexure section 340 of leg 420.

The two sections of each leg 420 are positioned so that the direction of translational movement allowed by the first flexure section 330 is essentially perpendicular to the direction of translational movement allowed by the second flexure section 340. The relative orientation of the flexure sections 330 and 340 allow movement of the moving plate 50 in two dimensions perpendicular to the general direction indicated by the legs 420. In the specific embodiment of FIG. 4, the first flexure sections 330 allow movement of the moving plate 50 perpendicular to the long axis of the base section 410. Additionally, the second flexure sections 340 allow movement parallel to the long axis of the base section 410.

In the embodiment of FIG. 4, four legs 420 are employed. However, other embodiments of the present invention may utilize more or fewer legs 420 depending on the requirements of the particular application involved, in a fashion similar to that described for the flexures 320 of apparatus 300 (from FIG. 3). For example, if more rigidity in compression along the general direction defined by the legs 420 is required, more legs 420 may be utilized. However, if compression is not a significant concern, fewer legs 420 may be employed.

From the foregoing, the embodiments of the invention discussed above have been shown to provide two-dimensional movement with essentially no static friction by way of a flexure and a flexure apparatus fashioned from a single contiguous piece of semi-rigid material. In addition, other specific devices embodying the invention are also possible. Therefore, the present invention is not to be limited to the specific forms so described and illustrated; the invention is limited only by the claims.

What is claimed is:

1. A two-dimensional flexure comprising:

a single contiguous member having a first and second flexure section, the first and second flexure sections detached from each other and extending in opposite directions beyond a portion of the flexure where the first flexure section is attached to the second flexure section, the first flexure section having a first broad surface in relation to its thickness, the thickness thin enough to allow translational motion perpendicular to the first broad surface and the first broad surface wide enough to resist translational motion parallel to the first broad surface, the second flexure section having a second broad surface in relation to its thickness, the thickness thin enough to allow translational motion perpendicular to the second broad surface and the second broad surface wide enough to resist translational motion parallel to the second broad surface, the second flexure section being oriented perpendicular to the first flexure section so that the direction of translational motion allowed by the second flexure section is essentially perpendicular to the direction of translational motion allowed by the first flexure thereby allowing two-dimensional translational motion of the flexure perpendicular to the length of the flexure.

2. The two-dimensional flexure of claim 1, wherein the flexure is injection-molded from plastic.

3. The two-dimensional flexure of claim 1, wherein the flexure is injection-molded from metal.

4. The two-dimensional flexure of claim 1, wherein the flexure is fashioned from a single flat portion of sheet metal.

5. The two-dimensional flexure of claim 1, wherein the flexure is fashioned from a single flat portion of plastic.

6. A two-dimensional flexure assembly, comprising:

a base plate; and a plurality of two-dimensional flexures, each flexure coupled with and extending substantially perpendicularly from the base plate, each flexure having a first and second flexure sections, the first and second flexure sections detached from each other and extending in opposite directions beyond a portion of the flexure where the first flexure section is attached to the second flexure section, the first flexure section having a first broad surface in relation to its thickness, the thickness thin enough to allow translational motion perpendicular to the first broad surface and the first broad surface wide enough to resist translational motion parallel to the first broad surface, the second flexure section having a second broad surface in relation to its thickness, the thickness thin enough to allow translational motion perpendicular to the second broad surface and the second broad surface wide enough to resist translational motion parallel to the second broad surface, the first flexure section being positioned between the base plate and the second flexure section, the second flexure section being oriented perpendicular to the first flexure section so that the direction of translational motion allowed by the second flexure section is essentially perpendicular to the direction of translational motion allowed by the first flexure thereby allowing two-dimensional translational motion of the flexure perpendicular to the length of the flexures; the second flexure section of each of the flexures being configured to couple with an object that is to be allowed to move in two dimensions perpendicular to the direction defined by the flexures.

7. The two-dimensional flexure assembly of claim 6, wherein the flexure assembly has two flexures.

8. The two-dimensional flexure assembly of claim 6, wherein the flexure assembly has four flexures.

9. A two-dimensional flexure apparatus, comprising:

a single continuous member having a base section and a plurality of legs extending substantially perpendicularly from the base section, each of the legs having a first and second flexure section, the first and second flexure sections detached from each other and extending in opposite directions beyond a portion of the flexure where the first flexure section is attached to the second flexure section, the first flexure section having a first broad surface in relation to its thickness, the thickness thin enough to allow translational motion perpendicular to the first broad surface and the first broad surface wide enough to resist translational motion parallel to the first broad surface, the second flexure section having a second broad surface in relation to its thickness, the thickness thin enough to allow translational motion perpendicular to the second broad surface and the second broad surface wide enough to resist translational motion parallel to the second broad surface, the first flexure section being positioned between the base section and the second flexure section, the second flexure section being oriented perpendicular to the first flexure section so that the direction of translational motion allowed by the second flexure section is essentially perpendicular to the direction of translational motion allowed by the first flexure section thereby allowing two-dimensional translational motion of the legs perpendicular to the lengths of the legs, the second flexure section of each of the legs being configured to couple with an object that is to be allowed to move in two dimensions perpendicular to the direction defined by the legs.

10. The two-dimensional flexure apparatus of claim 9, wherein the flexure apparatus has two legs.

11. The two-dimensional flexure apparatus of claim 9, wherein the flexure apparatus has four legs.

12. The two-dimensional flexure apparatus of claim 9, wherein the flexure apparatus is injection-molded from plastic.

13. The two-dimensional flexure apparatus of claim 9, wherein the flexure apparatus is injection-molded from metal.

14. The two-dimensional flexure apparatus of claim 9, wherein the flexure apparatus is fashioned from a single flat portion of sheet metal.

15. The two-dimensional flexure apparatus of claim 9, wherein the flexure apparatus is fashioned from a single flat portion of plastic.

* * * * *